US008494131B2

(12) United States Patent
Han

(10) Patent No.: US 8,494,131 B2
(45) Date of Patent: *Jul. 23, 2013

(54) APPARATUS AND METHOD FOR DATA COMMUNICATION

(75) Inventor: Chang-Min Han, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

This patent is subject to a terminal disclaimer.

(21) Appl. No.: 12/929,095

(22) Filed: Dec. 30, 2010

(65) Prior Publication Data

US 2011/0096920 A1    Apr. 28, 2011

Related U.S. Application Data

(63) Continuation of application No. 11/316,904, filed on Dec. 27, 2005, now Pat. No. 7,881,445.

(30) Foreign Application Priority Data

Jan. 10, 2005    (KR) .............................. 2005-0002230

(51) Int. Cl.
*H04M 11/00*    (2006.01)

(52) U.S. Cl.
USPC .................................... 379/100.15

(58) Field of Classification Search
USPC .................................... 379/100.15
See application file for complete search history.

(56) References Cited

U.S. PATENT DOCUMENTS

| 5,533,048 | A | * | 7/1996 | Dolan | ............................ | 375/222 |
| 5,671,250 | A | | 9/1997 | Bremer et al. | | |
| 6,246,754 | B1 | * | 6/2001 | Cole et al. | ................... | 379/93.29 |
| 2003/0198288 | A1 | | 10/2003 | Abdelilah et al. | | |
| 2004/0213170 | A1 | | 10/2004 | Bremer | | |

FOREIGN PATENT DOCUMENTS

| EP | 1408668 A2 | 4/2004 |
| JP | 10-191014 A | 7/1998 |
| JP | 2000-101810 A | 4/2000 |

OTHER PUBLICATIONS

European Search Report mailed Aug. 10, 2011 for counterpart European application.
Office Action mailed on Sep. 13, 2012 in European Patent Application No. 06 100 177.2.

* cited by examiner

*Primary Examiner* — Alexander Jamal
(74) *Attorney, Agent, or Firm* — Roylance, Abrams, Berdo & Goodman, L.L.P.

(57) ABSTRACT

The present invention relates to a data communication method and apparatus comprising a noise information memory for storing noise information to indicate a degree of noise on a current communication line and capable of performing communications in a plurality of communication modes. The method and apparatus further comprising a mode memory for storing the plurality of communication modes in response to the degree of noise, and a mode change control unit for reading current noise information from the noise information memory and selecting the communication mode corresponding to the current degree of noise from the mode memory, and changing the current communication mode into the selected communication mode. The present invention provides an apparatus and a method for highly reliable data communication with simplified construction.

13 Claims, 4 Drawing Sheets

FIG. 2

| COMMUNICATION MODE | NOISE DEGREE |
|---|---|
| V.34 | a ~ b |
| V.17 | b ~ c |
| V.29 | c ~ d |
| V.27 | d ~ e |

APPARATUS AND METHOD FOR DATA COMMUNICATION

PRIORITY

This application is a continuation of U.S. patent application Ser. No. 11/316,904, filed Dec. 27, 2005 now U.S. Pat. No. 7,881,445, which in turn claims the benefit under 35 U.S.C. §119(a) of Korean Patent Application No. 2005-0002230, filed on Jan. 10, 2005, in the Korean Intellectual Property Office, the entire disclosures of both of said prior applications being hereby incorporated by reference.

BACKGROUND OF INVENTION

1. Field of Invention

The present invention relates to an apparatus and method for data communication through a telephone communication network. More particularly, the present invention relates to an apparatus and method for highly reliable data communication by changing a communication mode adaptively to telephone line condition using a simplified configuration.

2. Description of the Related Art

Traditional communications equipment for data communication through a telephone communication network consists of a modem for modulating and demodulating digital data to transmit the data through analog communication lines constituting the telephone communication network. This kind of modem conforms to Standards recommended by International Telecommunication Union Telecommunication Standardization Sector (ITU-T). Among the standards, V.34 allows modems to transmit data at up to 28,800 bit/sec maximum. And although V.34 enables data transmission at a higher rate than other Standards, such as, V.17, V.29, V.27, among others, V.34 has lower communication reliability than other Standards under abnormal line conditions, such as the presence of noise in the communication line.

Specifically, transmitting and receiving terminal modems, transmitter, and receiver communicate with each other using the V.34 start-up procedure based on V.8 under the V.34 mode. If the V.34 start-up procedure has been successful, data communications are continued under the V.34 mode. Conversely, the communication mode changes to the V.17 mode if the V.34 start-up procedure fails (refer to ITU-T T.30).

However, the V.34 start-up procedure may successfully complete, and communications may proceed under the V.34 mode, despite an irregular channel condition subject to noise. In this situation, a command may not be successfully received from the transmitter's modem, or a Resync/Interpage negotiation may fail due to the abnormal line condition.

To solve these problems, Japanese Patent First Publication No. 2000-101810, which is hereby incorporated by reference, proposes a communication device capable of preventing occurrence of a communication error by selecting an optimum communication mode in response to line conditions. Referring to this publication, the signal-to-noise ratio (SNR) of a line is calculated by using the noise voltage detected by a voltage detection section during a silence period of the line, and a voltage of an ANSam signal detected by the voltage detection section when receiving a protocol signal. The calculated SNR is compared with a predetermined value. As a result, if it is determined that the line condition is appropriate for the V.34 communication mode, communication is conducted in the V.34 mode. If not, communication is conducted in a V.17 communication mode, or lower.

The communication device taught by Japanese Patent First Publication No. 2000-101810 requires an AC voltage detection circuit to detect an AC voltage on the line when calculating the SNR, and thus, it is structurally complicated. Further, the SNR can be calculated after measuring the voltage twice, that is, once during the silence period, and another once when receiving a protocol signal, thereby making this technique a complicated process.

SUMMARY OF THE INVENTION

Aspects of the present invention provide an apparatus and method for highly reliable data communication with a simplified construction by changing the communication mode in response to line conditions.

The foregoing and other aspects of the present invention are achieved by providing a communication apparatus comprising a noise information memory for storing noise information to indicate the degree of noise in a current communication line and capable of performing communications in a plurality of communication modes. The communication apparatus further comprising a mode memory for storing the plurality of communication modes in response to the degree of noise, and a mode change control unit for reading out current noise information from the noise information memory, selecting the communication mode corresponding to the current degree of noise from the mode memory, and changing the current communication mode to the selected communication mode.

According to an aspect of the present invention, the plurality of communication modes comprise modem or facsimile Standards recommended in ITU-T.

According to another aspect of the present invention, the plurality of communication modes may refer to V.34, V.17, V.29 and V.27, respectively, and the communication apparatus may start an initial communication in the V.34 mode.

According to another aspect of the present invention, the noise information may refer to an eye quality monitor (EQM).

According to another aspect of the present invention, the mode change control unit may select the communication mode between phases for line probing and training in the V.34 start-up procedure.

According to another aspect of the present invention, the mode change control unit changes the communication mode according to the condition of the communication line in a phase for V.8 negotiation.

The foregoing and other aspects of the present invention are achieved by providing a communication method performing communications by changing a communication mode of a communication apparatus comprising a noise information memory for storing noise information to indicate the degree of noise in a current communication line and capable of performing communications in a plurality of communication modes. The communication apparatus further comprising storing the plurality of communication modes in a predetermined memory in response to the degree of noise; selecting the communication mode in response to the current degree of noise from the predetermined memory by reading out current noise information from the noise information memory, and changing the current communication mode to the selected communication mode.

According to an aspect of the present invention, selection of the communication mode and change to the mode selected may be performed between phases for line probing and training in the V.34 start-up procedure.

According to another aspect of the embodiments of the present invention, the communication mode may change according to the condition of the communication line in a phase for V.8 negotiation.

BRIEF DESCRIPTION OF THE DRAWINGS

The above and other aspects, features and advantages of the present invention will become more apparent from the following detailed description with reference to the accompanying drawings, in which:

FIG. 2 shows a table illustrating communication modes stored in a mode memory according to an exemplary embodiment of the present invention;

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
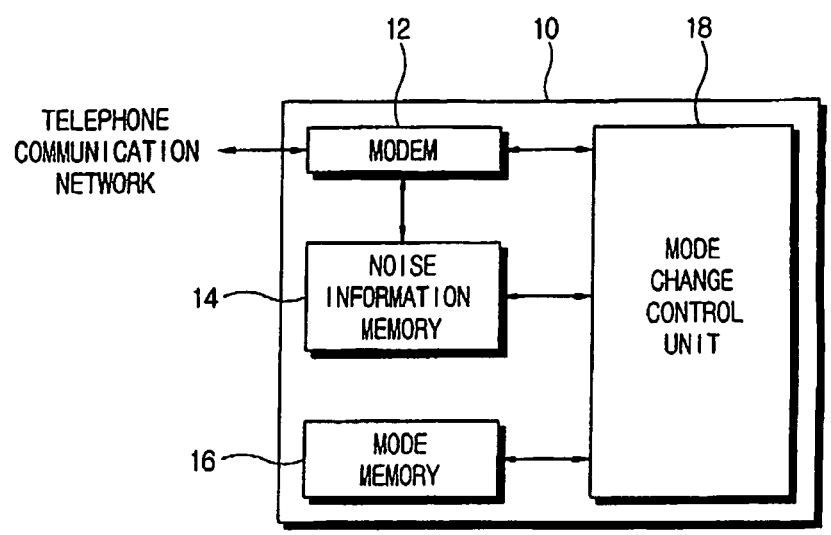
FIG. 1 shows a block diagram illustrating a construction of a communication apparatus according to an exemplary embodiment of the present invention.

FIG. 1 shows a block diagram illustrating a communication apparatus 10 in accordance with an exemplary embodiment of the present invention. The communication apparatus 10 is capable of performing communications with a plurality of communication modes in response to a plurality of data transmission speeds, and enables proper communications by selecting one of the communication modes with a data transmission speed in response to the condition of a communication line.

An exemplary embodiment of the communication apparatus 10 may be, for example, a facsimile machine, which performs a facsimile communication with a counterpart facsimile machine through a telephone communication network. The communication apparatus 10 comprises a modem 12 processing signals necessary for receiving and transmitting facsimile signals through an analog communication line.

The communication apparatus 10 conforms to modem and facsimile standards recommended by the International Telecommunication Union Telecommunication Standardization Sector (ITU-T). In one exemplary embodiment, modem 12 performs communications according to V.34, the modem standard recommended by the ITU-T. Further, in addition to V.34, the communication apparatus 10 can perform communications according to V.17, V.29 and V.27, the facsimile standards recommended by the ITU-T.

In other words, to provide the highest speed of data transmission without occurrence of communication error, the communication apparatus 10 performs communications according to V.34 when using the highest speed (which may be referred to as "V.34 mode"), then changes the communication mode to V.17, V.29 or V.27 (which may be referred to as "V.17, V.29 or V.27 modes," respectively) when using lower speeds according to the noise condition of the communication line.

Modem 12 connects to a counterpart modem according to a communication protocol such as V.34 and is also capable of performing signal processing appropriate for facsimile signals transmitted and received after connection. That is, the facsimile transmission capabilities of modem 12 preferably comprise analog-to-digital (A/D) conversion, encoding, decoding, modulation, demodulation, scramble, descramble, equalization, echo cancellation, timing recovery, and carrier recovery, among others.

Modem 12 may comprise separate hardware, for example, a dedicated modem chipset comprising functionality to connect to a counterpart modem and perform signal processing on facsimile signals transmitted and received. In another exemplary embodiment, modem 12 may be implemented as software suitably programmed for a general purpose processor and stored in memory (that is, read only memory (ROM)) and executed by the general purpose processor.

The communication apparatus 10 determines the noise condition on the communication line and provides information indicating the result. The communication apparatus 10 in this exemplary embodiment comprises a noise information memory 14 for storing noise information to indicate the current degree of noise on the communication line.

Noise information, as used herein, refers to an eye quality monitor (EQM). The EQM is the value obtained from filtering the squared magnitude of an error vector, which can be any factor indicative of the signal quality in V.34. The error vector, as used herein, is any factor to indicate relative signal quality, wherein the magnitude of the average error vector increases as the signal quality deteriorates.

By calculating the magnitude of an error vector and filtering the result, a number inversely proportional to signal quality can be derived, which is referred to as EQM. The EQM value can indicate an average signal power contained in an error component, the signal power being proportional to the possibility that an error may occur in the received data. In other words, as EQM increases, the SNR decreases.

The communication apparatus 10 may determine an approximate bit error rate (BER) from the EQM value. When it is determined that the BER exceeds an allowable degree, the communication apparatus 10 allows the modem 12 to fallback to the communication mode having a lower speed to improve the BER. As described above, the communication apparatus 10 stores the EQM value in the noise information memory 14 to be accessible when determining the condition of the communication line.

In addition, the communication apparatus 10 further comprises a mode memory 16 for storing the communication modes designated in advance to correspond to EQMs based on communication line conditions. FIG. 2 is a table illustrating the communication modes stored in mode memory 16 according to an exemplary embodiment of the present invention.

Referring to FIG. 2, the communication modes V.34, V.17, V.29 and V.27, and the degree of communication line noise allowed for the modes, are classified into four ranges of numerical values as 'a' to 'e' in mode memory 16, where 'a' indicates the smallest numeric value and 'e' indicates the largest numeric value. Each classification indicates a predetermined EQM value. Specified values of EQMs may be determined by experimentally measuring the degree of communication line noise allowed for V.34, V.17, V.29 and V.27.

The noise information memory 14 and mode memory 16 may be embodied as register memory and read access memory (RAM).

A mode change control unit 18 determines the condition of the communication line and sets the modem 12 to one of the communication modes appropriate for the line condition. That is, the mode change control unit 18 compares the degree of current line noise obtained by reading the noise information on the current communication line from the noise information memory 14 with the degree of noise allowed for the current communication channel obtained by reading mode memory 16. Based on the result of the comparison, it is determined whether the current noise degree is allowable for the current communication mode. If it is determined that the current degree of noise exceeds the allowable range, the current communication mode is changed into a communication mode in which the current level of noise is allowable.

For example, if it is determined that the current degree of noise exceeds the numerical value under classification 'c' but is less than the numerical value for classification 'd' when the current modem 12 is operated in V.34 mode, the mode change control unit 18 stops the operation of modem 12 in V.34 mode and allows modem 12 to be operated in corresponding V.29 mode. In this case, the mode change control unit 18 may set a bit in the DIS command indicating communication mode corresponding to V.29 and transmit the command and data to the counterpart modem.

The mode change control unit 18 may control the change of communication mode between phases for line probing and training in the V.34 start-up procedure. Four phases of the V.34 start-up procedure are illustrated by FIG. 3.

Figure 3:
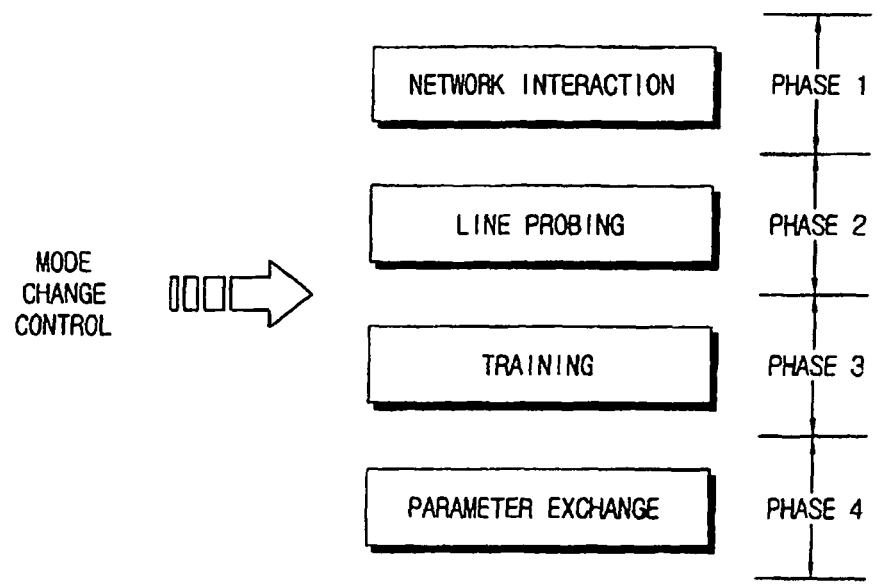
FIG. 3 shows a diagram illustrating relations of a V.34 start-up procedure and mode conversion controls according to an exemplary embodiment of the present invention.

As illustrated by FIG. 3, the communication procedure is conducted through four phases of connection to the counterpart modem in V.34 mode. Phase 1 refers to network interaction, which is defined in the ITU-T V.8 Standard. Phase 2 refers to line probing, which is setting various parameters of the modem 12 and conducting line probing and ranging. Phase 3 refers to training, which is used for initial training of an equalizer and an echo canceller. Phase 4 refers to parameter exchange, which is used for final training and final exchange of data mode modulation parameters.

The mode change control unit 18 determines the status of each phase in the V.34 start-up procedure. If the mode change control unit 18 determines that the current phase is the phase immediately preceding the training phase, mode change control unit 18 changes communication mode. Modem 12 may store information to indicate the status of the V.34 start-up procedure periodically in a predetermined memory. In addition, the mode change control unit 18 may change the communication mode of the modem 12 based on the condition of the communication line during the ITU-T V.8 negotiation phase.

The mode change control unit 18 may be implemented as software appropriately programmed for a predetermined general purpose processor to conduct the change control function of the communication mode, stored in a predetermined memory (for example, ROM), and executed by a general purpose processor.

Figure 4:
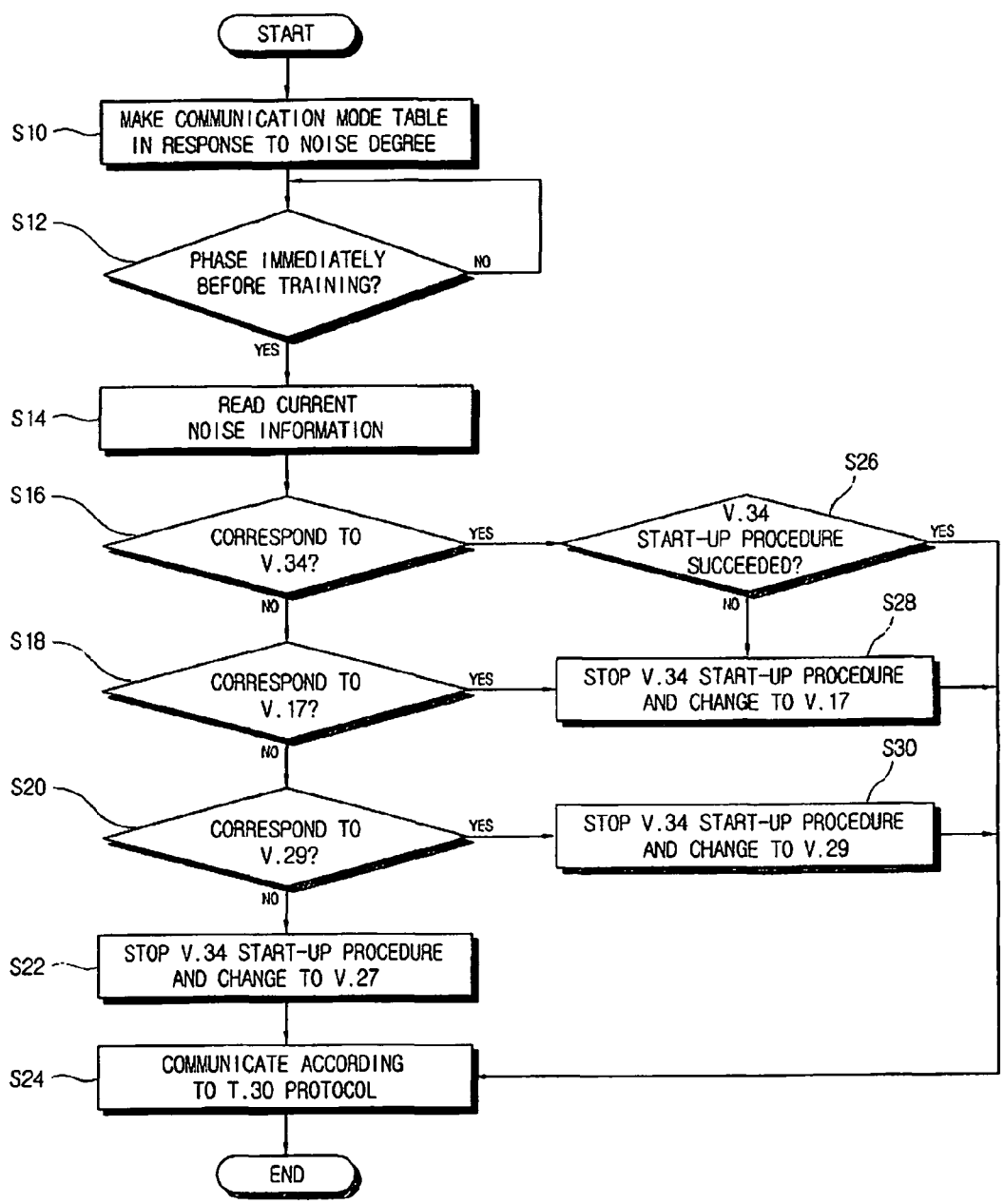
FIG. 4 shows a flow chart illustrating an operation of the communication apparatus according to FIG. 1.

FIG. 4 is a flow chart illustrating an operation of the communication apparatus 10 according to FIG. 1. Referring to FIG. 4, the operation of the communication apparatus 10 according to an exemplary embodiment of the present invention will be described.

A table for a plurality of communication modes corresponding to the degree of noise on the communication line is made and stored in mode memory 16 at step S10.

When the V.34 start-up procedure begins communication with the counterpart modem, the mode change control unit 18 determines whether the current phase of the V.34 start-up procedure immediately precedes the training phase at a step S12. If it is determined that the phase is not immediately before the training phase ("No" in step S12), the communication apparatus 10 continues the V.34 start-up procedure.

If it is determined that the V.34 start-up procedure is at a phase immediately before the training phase ("Yes" in step S12), the mode change control unit 18 reads the noise information of the current communication line from noise information memory 14 and the degree of noise allowed in V.34 mode from the mode memory 16 at step S14.

The mode change control unit 18 determines whether the degree of noise of the current communication line is in the range allowed for by the V.34 mode. If it is determined that the noise level is within the allowable range of the V.34 mode ("Yes" in step S16), it is determined whether the V.34 start-up procedure has been successful at step S26.

If it is determined that the V.34 start-up procedure has failed ("No" in step S26), the mode change control unit 18 stops the V.34 start-up procedure and allows the modem 12 to operate in V.17 mode.

If it is determined that the V.34 start-up procedure has been successful ("Yes" in step S26), the modem 12 proceeds to communicate with the counterpart modem according to T.30 protocol at step S24.

On the other hand, the mode change control unit 18 determines whether the degree of noise on the current communication channel is within the range allowed for by the V.34 mode. If it is determined that the noise level exceeds the range allowable by the V.34 mode ("No" in step S16), the mode change control unit 18 reads the degree of noise allowed for by the V.17 mode from the mode memory 16 and determines whether the degree of noise on the current communication line is allowable for by the V.17 mode at step S18.

If it is determined that the degree of noise on the current communication line is allowed for by the V.17 mode ("Yes" in step S18), the mode change control unit 18 stops the V.34 start-up procedure and allows the modem 12 to operate in V.17 mode at step S28. Modem 12 then proceeds to communicate with the counterpart modem according to T.30 protocol at step S24.

If it is determined that the degree of noise on the current communication line is not acceptable by the V.17 mode ("No" in step S18), the mode change control unit 18 reads the degree of noise allowed for by V.29 mode from mode memory 16 and determines whether the degree of noise on the current communication line is allowable for by the V.29 mode at step S20.

As a result, if it is determined that the degree of noise on the current communication channel is acceptable by the V.29 mode ("Yes" in step S20), the mode change control unit 18 stops the V.34 start-up procedure and allows the modem 12 to operate in V.29 mode at step S30. Modem 12 then proceeds to communicate with the counterpart modem according to T.30 protocol at step S24.

If it is determined that the degree of noise on the current communication line is not acceptable by the V.29 mode ("No" in step S20), the mode change control unit 18 stops the V.34 start-up procedure and allows the modem 12 to operate in V.27 mode at step S22. Modem 12 then proceeds to communicate with the counterpart modem according to T.30 protocol at step S24.

As described above, according to exemplary embodiments of the present invention, there is provided a communication apparatus and method capable of performing highly reliable communications by changing communication mode in response to communication line condition, with a simplified configuration.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims.

What is claimed is:

1. A data communication apparatus, being capable of performing data communications in a plurality of communication modes, comprising:
   a noise information memory for storing noise information to indicate a degree of noise on a current communication line;
   a mode memory for storing the plurality of communication modes; and
   a mode change control unit for reading current noise information from the noise information memory, the mode change control unit being configured to select the communication mode corresponding to the current degree of noise from the mode memory, and change the current communication mode to the selected communication mode;
   wherein the mode change control unit determines a status of each phase in a start-up procedure and reads the current noise information from the noise information memory if it is determined that current phase is a phase immediately preceding a training phase.

2. The data communication apparatus according to claim 1, wherein the plurality of communication modes comprise modem or facsimile standards recommended by ITU-T.

3. The data communication apparatus according to claim 2, wherein the plurality of communication modes refer to V.34, V.17, V.29 and V.27, and the communication apparatus is configured to start an initial communication in the V.34 mode.

4. The data communication apparatus according to claim 3, wherein the noise information refers to an eye quality monitor (EQM).

5. The data communication apparatus according to claim 4, wherein the mode change control unit is configured to select the communication mode between phases for line probing and training in a V.34 start-up procedure.

6. The data communication apparatus according to claim 2, wherein the mode change control unit is configured to change the communication mode according to the condition of the communication line in a phase for V.8 negotiation.

7. A data communication method for an apparatus performing data communications in a plurality of communication modes, the method comprising:
   determining a degree of noise on a communication line;
   storing noise information indicating the degree of noise in a noise information memory;
   storing a plurality of communication modes in a mode memory;
   determining a status of each phase in a start-up procedure;
   reading current noise information from the noise information memory if it is determined that current phase is a phase immediately preceding a training phase;
   selecting the communication mode from the mode memory using the read current noise information from the noise information memory; and
   changing the current communication mode to the selected communication mode.

8. The data communication method according to claim 7, wherein the plurality of communication modes comprise modem or facsimile standards recommended by ITU-T.

9. The data communication method according to claim 8, wherein the plurality of communication modes refer to V.34, V.17, V.29 and V.27, and the communication apparatus starts an initial communication in the V.34 mode.

10. The data communication method according to claim 9, wherein the noise information refers to an eye quality monitor (EQM).

11. The data communication method according to claim 10, wherein selecting the communication mode and changing to the current communication mode are performed between phases for line probing and training in a V.34 start-up procedure.

12. The data communication method according to claim 7, further comprising:
   changing the communication mode according to the condition of the communication line in a phase for V.8 negotiation.

13. A computer readable medium having stored thereon instructions for controlling a data communication apparatus to communicate in a plurality of communication modes, the computer readable instructions comprising:
   a first set of instructions for controlling the apparatus to determine a degree of noise on a communication line;
   a second set of instructions for controlling the apparatus to store noise information indicating the degree of noise in a noise information memory;
   a third set of instructions for controlling the apparatus to store a plurality of communication modes in a mode memory;
   a fourth set of instructions for controlling the apparatus to determine a status of each phase in a start-up procedure;
   a fifth set of instructions for controlling the apparatus to read current noise information from the noise information memory if it is determined that current phase is a phase immediately preceding a training phase;
   a sixth set of instructions for controlling the apparatus to select the communication mode from the mode memory using the read current noise information from the noise information memory; and
   a seventh set of instructions for controlling the apparatus to change the current communication mode to the selected communication mode.

* * * * *